(No Model.) 2 Sheets—Sheet 1.
H. P. WAYMAN.
DUMPING WAGON.

No. 465,904. Patented Dec. 29, 1891.

WITNESSES
Chas Taylor
Phill C. Masi

INVENTOR
Henry P. Wayman
by E. W. Anderson
his Attorney (No Model.) 2 Sheets—Sheet 2.

H. P. WAYMAN.
DUMPING WAGON.

No. 465,904. Patented Dec. 29, 1891.

WITNESSES
Chas. [signature]
Phill Masi

INVENTOR
Henry P. Wayman
by E. W. Anderson
his Attorney

UNITED STATES PATENT OFFICE.

HENRY P. WAYMAN, OF TRENTON, NEW JERSEY.

DUMPING-WAGON.

SPECIFICATION forming part of Letters Patent No. 465,904, dated December 29, 1891.

Application filed March 7, 1890. Serial No. 342,996. (No model.)

*To all whom it may concern:*

Be it known that I, HENRY P. WAYMAN, a citizen of the United States, and a resident of Trenton, in the county of Mercer and State of New Jersey, have invented certain new and useful Improvements in Dumping-Wagons; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
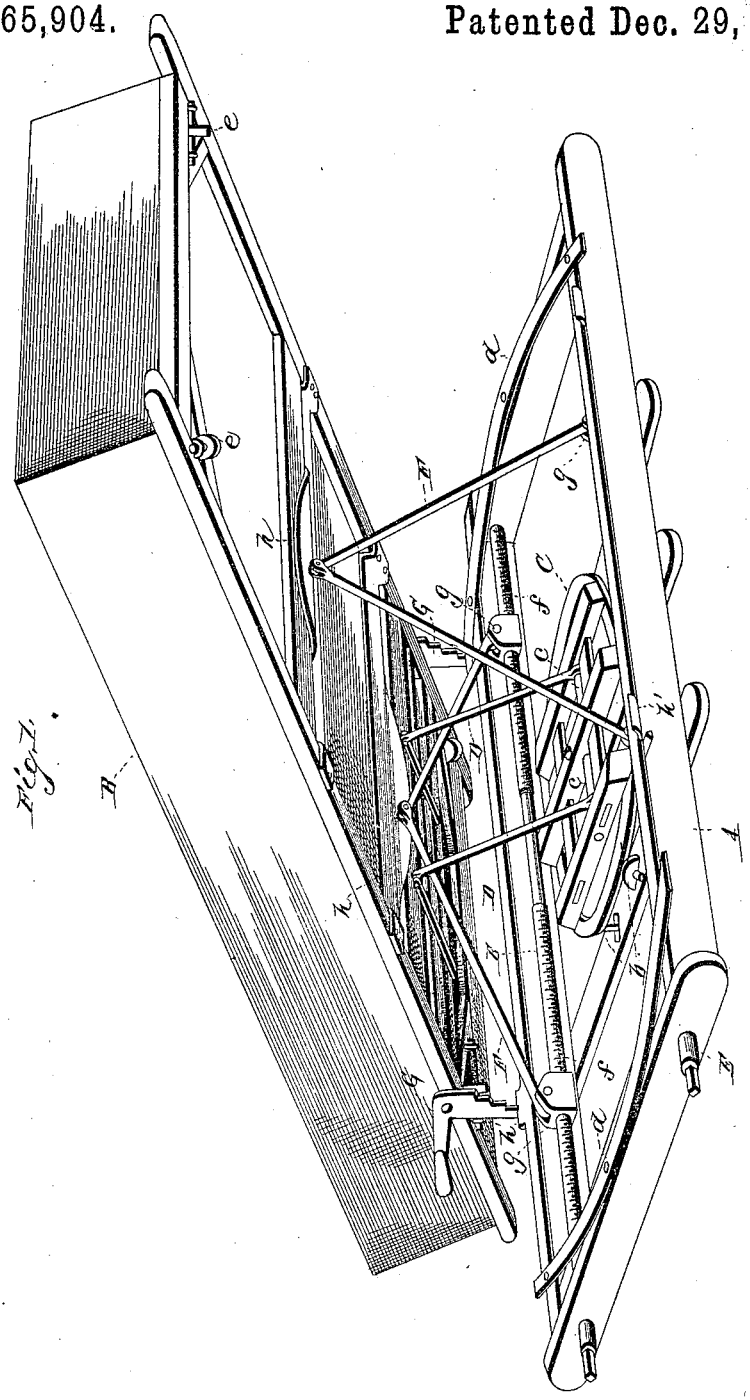
Figure 2:
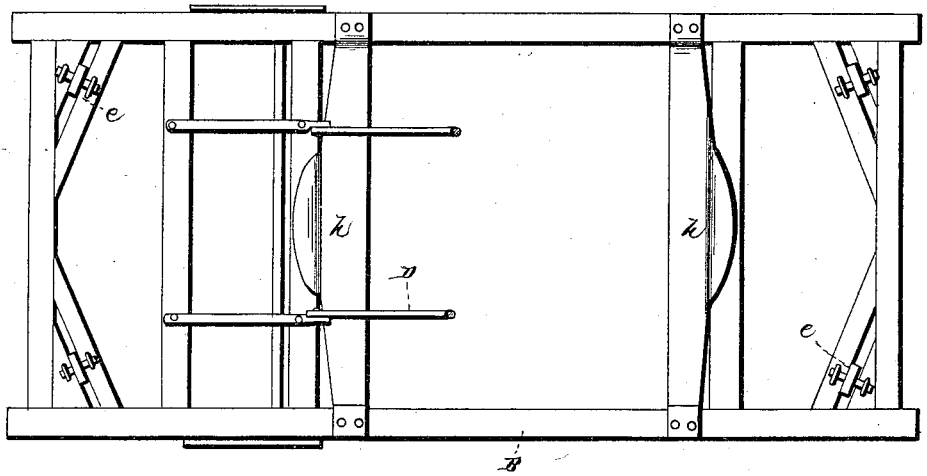
Figure 3:
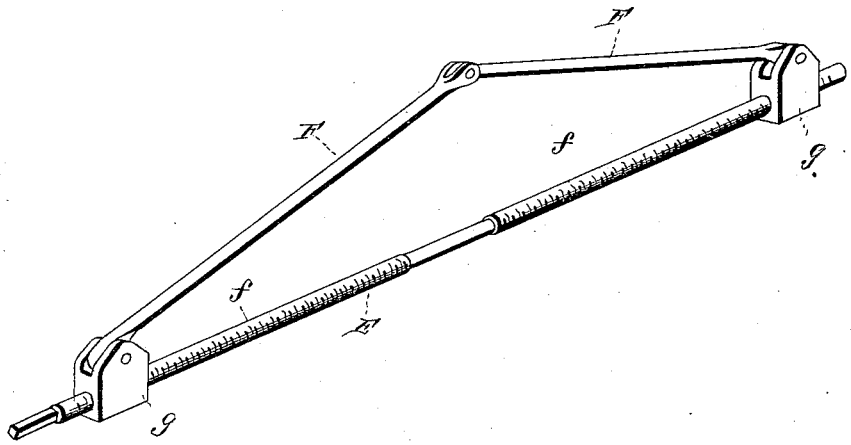

Figure 1 of the drawings is a perspective view. Fig. 2 is a bottom plan view of wagon-bed, and Fig. 3 is a detail view.

This invention relates to certain improvements in dumping-wagons, especially for coal; and it consists in the novel construction and combination of parts, as will appear from the following description and accompanying drawings.

In the drawings, A refers to the bed-frame, and B to the body, of a dumping-wagon.

C is a turn-table, which is centrally pivoted upon a cross-bar of the bed-frame A and rotatable upon friction rolls or bearings $b$, hung in other cross-bars of said bed-frame.

D D are hinge-rods pivotally connected at their lower ends to pivot-rods $c$, held centrally in cross-pieces or cleats of the turn-table C and pivoted at their upper ends to plates secured to the bottom of the wagon-body B, near its rear end.

Upon the bed-frame A, at its ends, are secured curved plates or tracks $d$, upon which rest and travel frictional rolls or wheels $e$, hung upon the under side of the body B, at its corners, as the body is revolved with the turn-table.

E E are parallel longitudinal screws having their bearings in the end pieces of the bed-frame A and provided with angular ends to permit of the application thereto of a crank or winch for their manipulation. Each of these screws has upon opposite sides of its center a right and left handed screw-thread $f f$, with which engage nuts or blocks $g$, forming fulcrums for the distant or outer ends of jointed or sectional rods or props F F, which at their maximum depression are out of contact with the wagon-body. Bearing-plates $h$ for the jointed or sectional rods or props F F are provided upon the bottom of the wagon-body.

At the sides of the wagon-body are hung, as in my concurrent application, stepped hand-levers G for engagement with studs or projections $h'$ on the sides of the bed-frame, for the temporary support of the wagon-body at the lower end when elevated as shown.

It will be seen that after the wagon-body has been swung around with the turn-table by the attendant or driver transversely to the length of the bed-frame, and then by applying a winch or crank to one of said screws—say that one next to the rear end of the wagon-body—the jointed or sectional rods or props thereof will be flexed or bowed upward against its respective bearing-plate on said wagon-body, thus raising or elevating the corresponding or rear end of said body, the hinge-rods permitting this. The levers G are at the same time brought into use to temporarily thus hold said end of the wagon-body. Now by similarly manipulating the other screw the front end of the wagon-body is elevated as desired. (Indicated in Fig. 1.) From this arrangement will be observed that the bearing of the wagon-body as it is elevated is wholly removed from the bed-frame by reason of employment of the hinge-rods, the latter being adapted or permitted to rise with said body as it is elevated.

Having thus described my invention, what I claim as new, and desire to secure by Letters Patent, is—

1. In a dumping-wagon, the combination, with the turn-table held upon the bed-frame, of the hinge-rods connected to said turn-table and to the wagon-body, and means for elevating said wagon-body, substantially as set forth.

2. In a dumping-wagon, the combination, with the wagon-body and means for hinging or pivotally supporting it in an elevated position, of the longitudinal screws having right and left hand screw-threads and supported in the bed-frame, and the sectional or jointed props or rods engaging said screws and acting upon said wagon-body, substantially as specified.

3. In a dumping-wagon, the combination, with the bed-frame carrying the turn-table, the wagon-body having hinge or pivoting-rod connection with said turn-table, and the screws having right and left hand screw-threads and supported in said bed-frame, of the sectional or jointed rods or props engaged by said screws and acting upon bearing-plates secured to said wagon-body, substantially as set forth.

4. In a dumping-wagon, the combination, with the bed-frame having the horizontally-arranged tracks at its ends, extending from side to side thereof, of the wagon-body having the frictional rolls or trucks depending therefrom on its under side at the corners, substantially as specified.

5. In a coal or dumping wagon, the combination, with the bed-frame and body having a hinge or pivotal connection with said frame, of the angular levers having each a series of stepped shoulders or teeth adapted to engage the bed-frame, substantially as set forth.

6. In a dumping-wagon, the combination, with the bed-plate, a turn-table mounted thereon, a wagon-body resting normally on the turn-table, and links connecting the body to the turn-table, of elevating devices between the body and the bed-plate, substantially as described.

7. In a dumping-wagon, the combination of the bed-plate having a turn-table mounted thereon, a wagon-body connected to said turn-table by links, toggle-levers between the body and bed-plate, and screw-threaded shafts for operating the same, substantially as specified.

In testimony whereof I affix my signature in presence of two witnesses.

HENRY P. WAYMAN.

Witnesses:
PHILIP C. MASI,
CHAS. L. TAYLOR.